United States Patent [19]
Neathery et al.

[11] Patent Number: 4,734,081
[45] Date of Patent: Mar. 29, 1988

[54] CONSTANT VELOCITY ELASTOMERIC BEARING JOINT

[75] Inventors: William D. Neathery, Fort Worth; Willem Broekhuizen, Arlington; Ernst C. Schellhase, Fort Worth, all of Tex.

[73] Assignee: Bell Helicopter Textron Inc., Fort Worth, Tex.

[21] Appl. No.: 6,687

[22] Filed: Jan. 23, 1987

Related U.S. Application Data
[62] Division of Ser. No. 794,800, Nov. 4, 1985.

[51] Int. Cl.$^4$ .................. F16D 3/28; B64C 27/35
[52] U.S. Cl. .................. 464/71; 384/221; 464/85; 464/138; 464/904
[58] Field of Search .................. 384/2, 590, 610, 221; 416/134 R, 134 A; 464/71, 85, 90, 93, 94, 96, 106, 137, 138, 147, 904

[56] References Cited

U.S. PATENT DOCUMENTS

| | | | |
|---|---|---|---|
| 1,328,893 | 1/1920 | Patrick | 464/93 |
| 1,978,939 | 10/1934 | Guy | 464/71 |
| 2,377,469 | 6/1945 | Venditty | 464/71 |
| 2,396,353 | 3/1946 | Venditty | 464/71 X |
| 3,067,596 | 12/1962 | Caunt | 464/71 |
| 3,263,447 | 8/1966 | Baker | 464/904 X |
| 4,505,688 | 3/1985 | Peterson | 464/138 X |
| 4,588,355 | 5/1986 | Ferris et al. | 416/134 A |

FOREIGN PATENT DOCUMENTS

| | | | |
|---|---|---|---|
| 2113357 | 10/1971 | Fed. Rep. of Germany | 464/93 |
| 514824 | 11/1939 | United Kingdom | 464/85 |

OTHER PUBLICATIONS

E. R. Wagner, "Cardan or Hooke Universal Joint", *Universal Joint and Drive Shaft Design Manual* (SAE-AE-7), Section 3.1.1, pp. 39–45 (1979).

E. R. Wagner, "Basic Requirements for Constant Velocity (CV) Universal Joints", *Universal Joint and Drive Shaft Design Manual* (SAE-AE-7), Section 3.2.1, pp. 99–101 (1979).

*Primary Examiner*—Daniel P. Stodola
*Attorney, Agent, or Firm*—Richards, Harris, Medlock & Andrews

[57] ABSTRACT

A constant velocity joint (200) for interconnecting a first shaft (202) to a second shaft (204) for bidirectional drive is provided. The constant velocity joint employs a carrier (218) which is formed with a series of apertures for receiving elastomeric bearing assemblies (220). The elastomeric bearing assemblies are provided with a spherical elastomeric bearing (60) and a cylindrical elastomeric bearing (48). Certain of the elastomeric bearing assemblies connect the carrier to one of the rotated members while the remaining elastomeric bearing assemblies connect the other rotating member to the carrier. The axis of symmetry of the carrier (218) will always bisect the angle of misalignment between the two rotating shafts to assure that a constant velocity joint is achieved.

2 Claims, 12 Drawing Figures

CONSTANT VELOCITY ELASTOMERIC BEARING JOINT

RELATED APPLICATION

This application is a divisional of U.S. patent application Ser. No. 794,800 filed Nov. 4, 1985 and entitled Constant Velocity Joint and Installation.

TECHNICAL FIELD

This invention relates to a constant velocity joint for connecting two nonaligned members for joint rotation, and in particular to a constant velocity joint between the mast and rotor hub of a helicopter.

BACKGROUND OF THE INVENTION

In power train design, it is often desirable and even necessary to connect a driving member to a driven member for joint rotation when the two axis of rotation are misaligned. While the use of a simple Cardan (or Hooke) universal joint would connect the two for joint rotation, this joint will induce angular velocity variations in the driven member, causing vibration at a frequency of twice the rotational velocity and oscillation in the torque transferred to the driven member.

In an effort to provide for more uniform power transmission, constant velocity joints have been developed. Frequently, such constant velocity joints require some sliding motion between elements in the joint, generating friction and power loss. However, some designs, including the one disclosed in U.S. Pat. No. 4,208,889, employ a number of elastomeric bearings to provide for movement in the constant velocity joint.

One specific application for the concept of the constant velocity joint is use in the drive train of a helicopter employing a flapping yoke. In such an environment, a mast connected to the power source rotates about a fixed axis relative to the helicopter main frame. A hub assembly is mounted to the mast for joint rotation. The hub assembly includes a yoke and a torque transferring mechanism to transmit torque from the mast to the yoke. The yoke is also supported by the torque transferring mechanism for flapping motion where the rotational axes of the mast and yoke can become misaligned. U.S. Pat. No. 4,323,332, issued Apr. 6, 1982, discloses an effort to provide a flexible connection between a mast and yoke. U.S. Pat. No. 4,477,225, issued Oct. 16, 1984, discloses an attempt to provide an elastomeric mounting of a yoke to a mast with a constant velocity joint.

In the particular environment of a helicopter, certain factors are of critical interest. The use of a constant velocity joint for the torque transferring mechanism is advantageous in avoiding vibration that would be induced by employing a conventional Cardan joint. In addition, the joint should have a high torque transmitting capacity and preferably require no lubrication. The joint should be self-centering in order to influence the yoke to return to alignment with the mast after flapping. If the joint should fail in service, the failure is preferably in a noncatastrophic failure mode which could permit the hub assembly to remain operational until the helicopter can be landed. It is also very advantageous to minimize the weight and size of the joint, thereby increasing the useful payload of the helicopter and improving the aerodynamic configuration as well. Finally, some axial motion between the yoke and mast is common and the joint should be capable of transmitting torque despite this motion. In other environments, a bidirectional drive feature, i.e. where either member could be the driving member, can be advantageous.

At this time, no constant velocity joint has been developed which satisfies the above criteria to an adequate degree. Therefore, a need exists for development of a constant velocity joint which satisfies these requirements, and in particular for a constant velocity joint which is adaptable for use in a flapping yoke helicopter environment.

SUMMARY OF THE INVENTION

In accordance with one aspect of the present invention, a constant velocity joint is disclosed for joining a driving member to a driven member for joint rotation. The driving member rotates about a first axis and the driven member rotates about a second axis with the first and second axes being capable of misalignment. The constant velocity joint employs a plurality of elastomeric bearing assemblies. Each bearing assembly has an inner rigid cylindrical section and an intermediate rigid section. A cylindrical elastomeric bearing is concentric with the inner and intermediate rigid sections and is bonded to the outer cylinderical surface of the inner section and to the inner cylinderical surface of the intermediate section. A spherical elastomeric bearing has an inner spherical surface bonded to the outer spherical surface of the intermediate rigid section. A rigid carrier is provided which defines an axis of symmetry and has a plurality of apertures formed therethrough centered on axes parallel to and spaced from the axis of symmetry. Each of the elastomeric bearing assemblies is positioned in one of the apertures, with the outer spherical surface of the spherical elastomeric bearing being bonded to the inner spherical surface of the wall of the aperture. Structure is provided for rigidly securing the inner rigid cylindrical section of selected elastomeric bearing assemblies relative to the driving member. Structure is provided for rigidly securing the inner rigid cylindrical sections of the other elastomeric bearing assemblies to the driven member. The cylindrical elastomeric bearings deform in an axial direction along the center axis of the bearing and in a direction generally perpendicular to the center axis and the first and second axis. The spherical elastomeric bearings deform angularly about the center point of the spherical section. The deformation of the elastomeric bearings permit the driving member to rotate the driven member with constant velocity. The rigid carrier has a center aperture centered generally on the axis of symmetry and one of the members has an extension defining a spherical surface centered within the center aperture and the other of the members defines a ring having an inner spherical surface concentric with the spherical surface on the extension, the constant velocity joint further including a spherical thrust elastomeric bearing having an outer spherical surface secured to the inner spherical surface of the ring and an inner spherical surface secured to the outer spherical surface of the extension to transmit axial thrust loads between the driving member and driven member.

BRIEF DESCRIPTION OF THE DRAWINGS

A more complete understanding of the invention can be had by referring to the following Detailed Description together with the accompanying drawings, wherein.

DETAILED DESCRIPTION

Referring now to the drawings, wherein like reference numerals designate like or corresponding elements throughout the views, there is shown in FIGS. 1-6 a constant velocity joint 10. The joint 10 is employed to transfer torque from the mast 12 in a helicopter to a yoke 14 for rotating the yoke and blades attached thereto to lift the helicopter. The yoke 14 is supported through the constant velocity joint 10 for flapping motion, where the axis of rotation of the yoke 14 can become misaligned with the axis of rotation of the mast 12. Despite such misalignment, the constant velocity joint 10 will provide for a smooth transfer of torque from the mast to the yoke without inducing vibration. Together, joint 10 and yoke 14 form the hub assembly of a helicopter.

Figure 1:
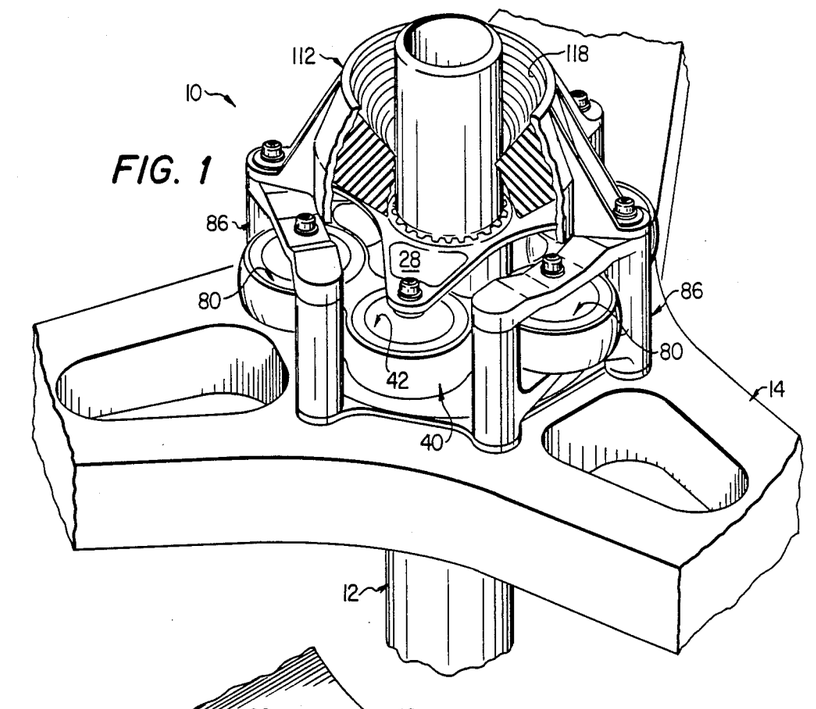
FIG. 1 is a perspective view of a constant velocity joint for a helicopter.
Figure 2:
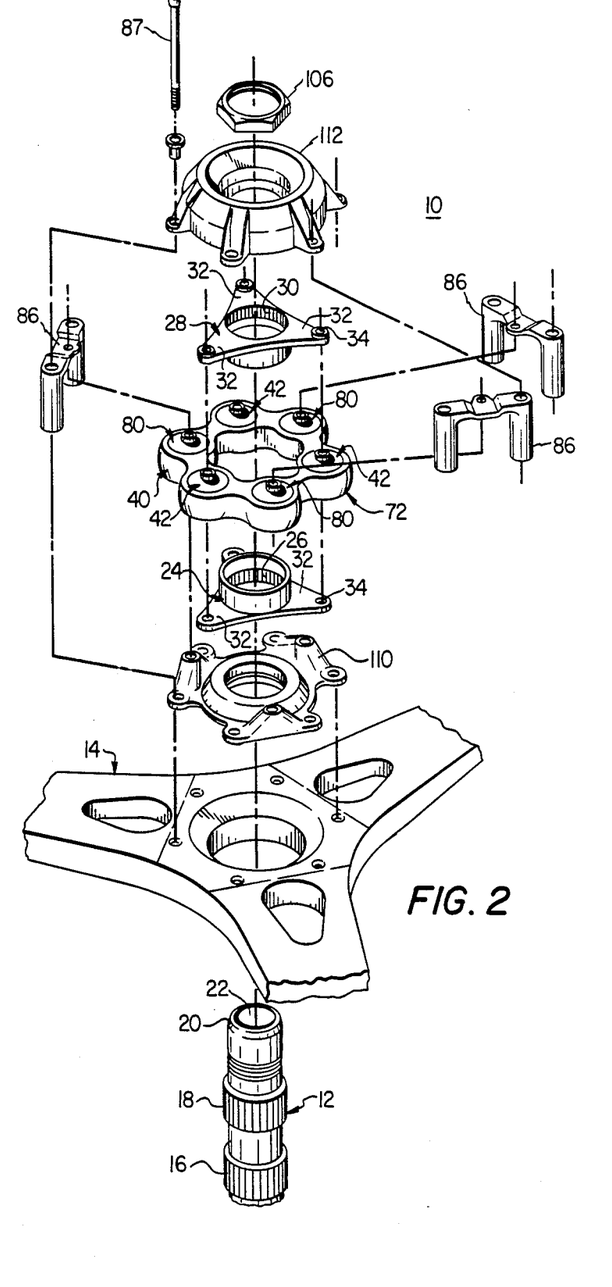
FIG. 2 is an exploded view of the constant velocity joint illustrated in FIG. 1.
Figure 3:
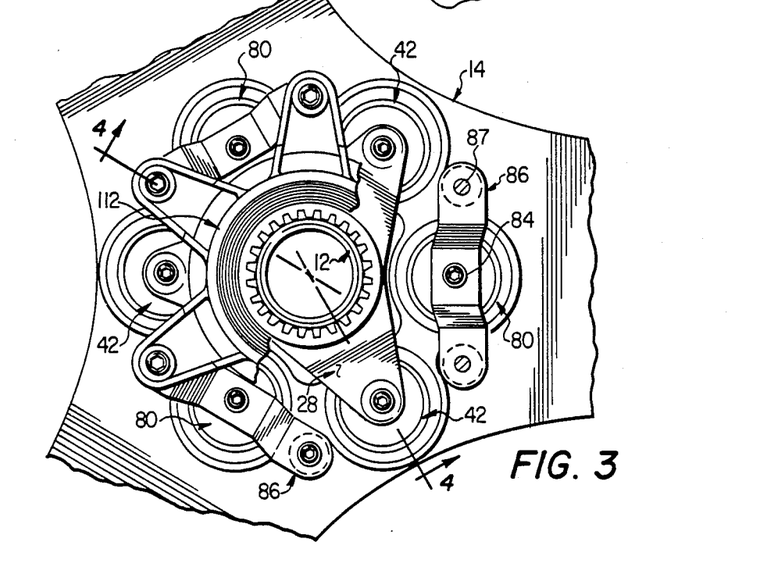
FIG. 3 is a top view of the constant velocity joint of FIG. 1 partially broken away to better illustrate the carrier.
Figure 6A:
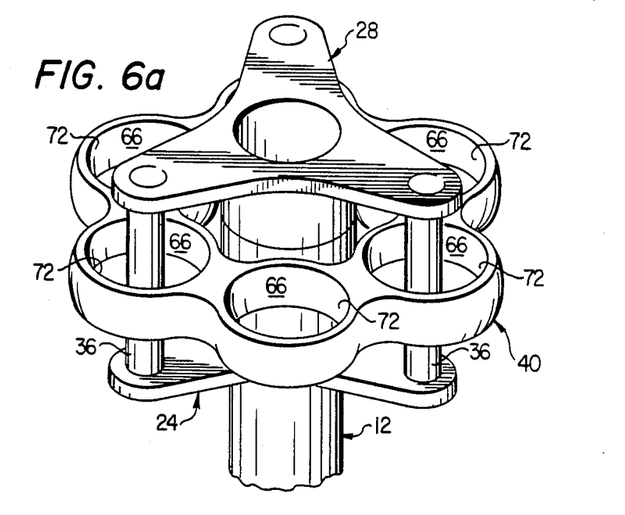
FIGS. 6a and 6b are schematic drawings of the constant velocity joint illustrated in FIG. 1 with the elastomeric bearing assemblies removed to better illustrate the plates splined to the rotor mast, the carrier and the pillow blocks secured to the yoke.

With particular reference to FIG. 2, the mast 12 can be seen to have splined sections 16 and 18 along its length, and a threaded end 20. The mast 12 is supported by the helicopter main frame and rotated about the driving axis 22 by the power plant in the helicopter. A lower triangular plate 24, having inner splines 26, is slid over the end of the mast 12 for engagement with spline section 16 for rotation with the mast. An upper triangular plate 28, having inner splines 30, is similarily splined to section 18. The plates 24 and 28 are axially restrained along axis 22 between shoulder 104 on mast 12 and a nut 106 threaded on threads 20. Each of the three arms 32 of the plates 24 and 28 extend radially outward from the driving axis and end with a hole 34. Through bolts 36 connect the two plates 24 and 28, as best seen in FIG. 6a.

Figure 4:
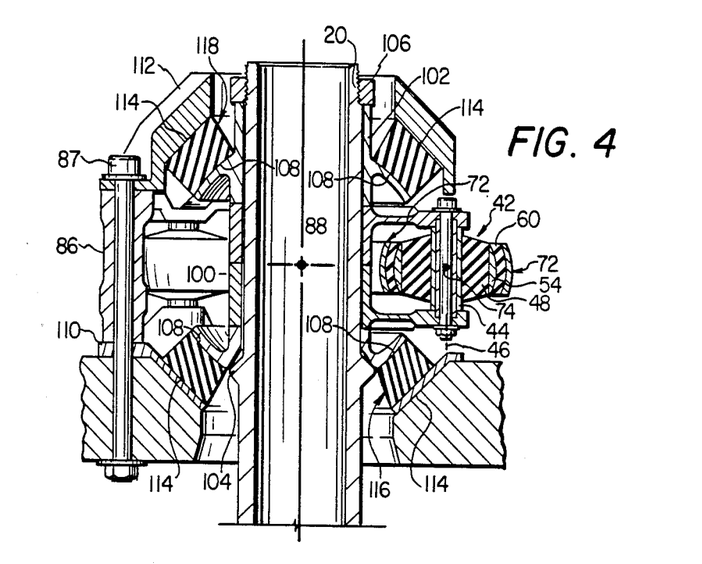
FIG. 4 is a vertical cross-sectional view of the constant velocity joint illustrated in FIG. 1 taken along multiple planes to show an elastomeric bearing assembly between the mast and carrier and an elastomeric bearing assembly between the carrier and the hub.

A carrier 40 is supported between the plates 24 and 28 and by the plates through three elastomeric bearing assemblies 42. With reference to FIGS. 4 and 6c, each elastomeric bearing assembly 42 can be seen to comprise a rigid inner cylindrical section 44 rigidly secured between the plates 24 and 28 by through bolt 36. The center elongate axis 46 of the cylindrical section 44 is thus parallel to, but radially spaced from, the driving axis 22. A tapered cylindrical elastomeric bearing 48 is provided and is concentric with the cylindrical section 44. The inner cylindrical surface 50 of the elastomeric bearing 48 is bonded or otherwise secured to the outer cylindrical surface 52 of the cylindrical section 44. As an alternative, surface 50 can simply be secured directly to bolt 36, although use of section 44 is preferred for ease of replacing assemblies 42 when worn or failed.

A rigid intermediate section 54 is concentric with section 44 and bearing 48 when the bearing assembly is not subjected to external forces, and the outer cylindrical surface 56 of the elastomeric bearing 48 is bonded or otherwise secured to the inner cylindrical surface 57 of the intermediate section 54.

A spherical elastomeric bearing 60 has an inner spherical surface 62 which is bonded or otherwise secured to an outer spherical surface 63 of intermediate section 54.

Figure 6B:
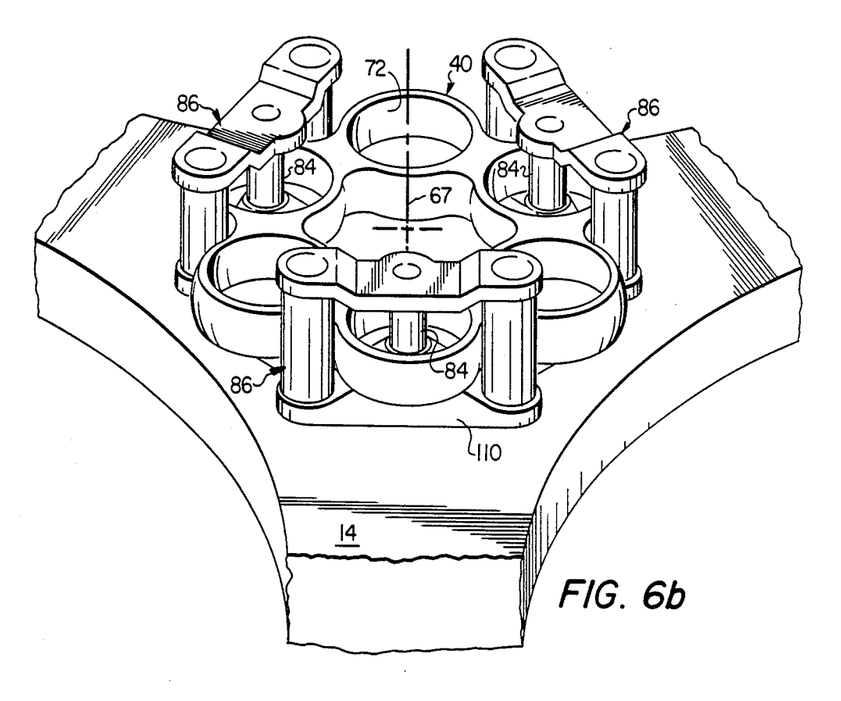
Figures 6C, 6D:
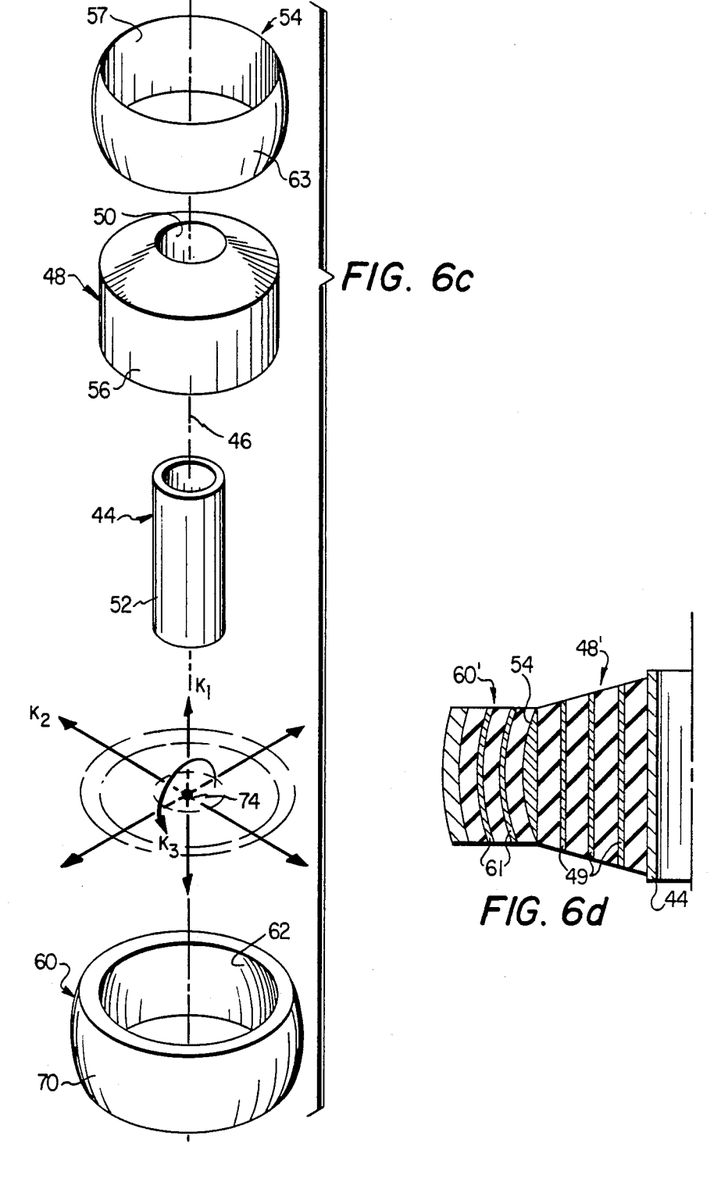
FIG. 6c is an exploded view of an elastomeric bearing assembly.
FIG. 6d is a partial cross section of a modified elastomeric bearing assembly having laminated elastomeric bearings.

With reference to FIGS. 6a and 6b, the carrier 40 can be seen to comprise an annular ring having a series of six apertures 66 formed therethrough around its circumference. The apertures 66 are generally centered along axes parallel to the axis of symmetry 67 of the carrier 40 and at a uniform radius from the axis of symmetry. The elastomeric bearing assemblies 42 are received in three of the apertures 66 in a symmetrical pattern on the carrier 40. The outer spherical surfaces 70 of spherical elastomeric bearings 60 (see FIG. 6c) are bonded or otherwise secured to the walls 72 of the apertures 66 and the walls 72 are preferably also configured as a spherical surface of equal radius to the outer spherical surfaces 70.

It can thus be seen that the three elastomeric bearing assemblies 42 support the carrier 40 between the plates 24 and 28 fixed to the mast 12. However, the elastomeric bearings 48 and 60 within each elastomeric bearing assembly are capable of deformation to permit the axis of symmetry 67 of the carrier 40 to become misaligned with the driving axis 22. In particular, the configuration and design of the elastomeric bearings 48 and 60 provide for three spring rates per elastomeric bearing assembly 42. With particular reference to FIG. 6c, $K_1$ represents the combined axial spring rates of the cylindrical elastomeric bearings 48 and 60 for deformation along the center axis 46. The value $K_2$ represents the radial spring rate of the elastomeric bearings 48 and 60 for motion perpendicular to the center axis 46. The value $K_3$ represents the angular spring rate of the elastomeric bearings 48 and 60 about the common center 74 of the elastomeric bearing 60, surface 54 and wall 72, which lies on the center axis 46. If desired, each elastomeric bearing can be laminated, as shown in FIG. 6d, with multiple layers of elastomeric material separated by rigid sections 49 in bearing 48' and rigid sections 61 in bearing 60'. The sections 49 and 61 are preferably contoured to the shape of the bearings. The sections 48 are therefore generally cylindrical while the sections 61 are formed with spherical surfaces.

With reference to FIG. 2, three elastomeric bearing assemblies 80 can be seen to secure the hub 14 to the carrier 40 for joint rotation, yet permit angular misalignment between the driven axis 82 of the hub 14 (see FIG. 5) and the axis of symmetry 67 of the carrier 40. The elastomeric bearing assemblies 80 are in all respects identical to the elastomeric bearing assemblies 42 and are interchangeable therewith. Each of the elastomeric bearing assemblies 80 is secured to the hub by a bolt 84 secured to the hub and supported at its upper end by a pillow block 86 having a U-shaped configuration. Each pillow block 86 is rigidly secured to the hub 14 by bolts 87 as best seen in FIG. 6b.

Figure 5:
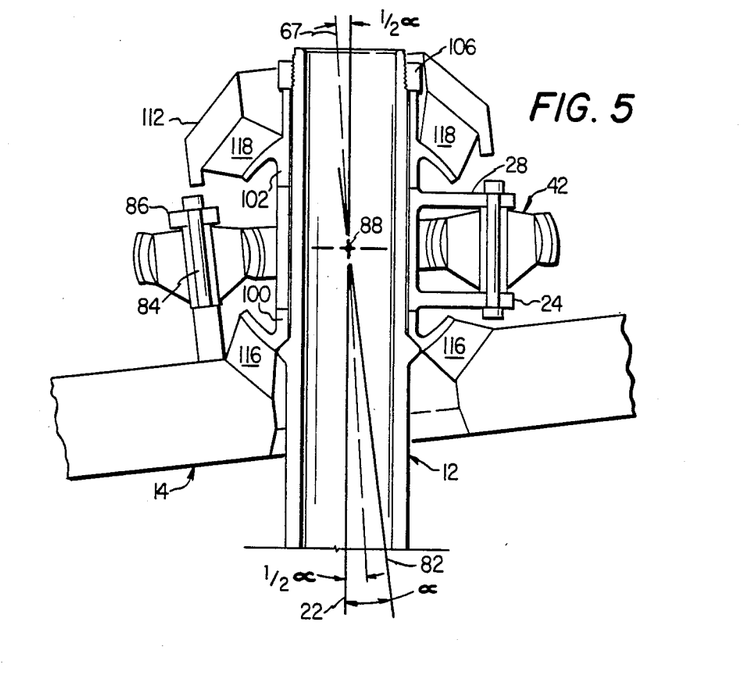
FIG. 5 illustrates the same vertical cross-sectional view shown in FIG. 4 showing a misalignment between the rotational axes of the mast and yoke.

Torque transmission to the yoke 14 from mast 12 is transmitted through elastomeric bearing assemblies 42, carrier 40 and elastomeric bearing assemblies 80. Thrust (or rotor lift) is transmitted from yoke 14 to mast 12 through elastomeric flapping springs 16 and 118 discussed hereinafter. Therefore, the yoke 14 is supported by the mast 12 through bearing assemblies 42, carrier 40 and bearing assemblies 80 without a nonelastomeric connection. This permits the yoke 14 to flap relative to the mast 12 about a flapping center 88 (see FIG. 5), so that the joint 10 will permit the driving axis 22 and driven axis 82 to become misaligned by an angle $\alpha$, as best seen in FIG. 5. The configuration of the constant velocity joint 10 is such that the axis of symmetry 67 of the carrier 40 will be misaligned with both the driving axis 22 and drive axis 82 by an angle $\alpha/2$. The axis of symmetry 67 will always be positioned to exactly bisect the angular misalignment between the mast and hub and assures that the joint will have constant velocity.

It will be observed that the flapping center 88 generally lies along the axis of symmetry of carrier 40 at the midpoint through the thickness of the carrier 40. The center 74 of each of the elastomeric bearing assemblies 42 and 80 are also preferably in the plane that is perpendicular to the axis of symmetry 67 and contains the midpoint through the thickness of carrier 40. This provides a compact arrangement for joint 10.

Due to the stiffness of the elastomeric bearings, the misalignment of the driving and driven shafts will create forces in the bearings urging the mast and hub back into alignment. These forces contribute to the control moment applied at the flapping center 88 of the yoke 14, which is defined as the point about which the yoke pivots relative to the mast 12.

The moment quantity contributed by the constant velocity joint 10 is calculated as follows:

$$M = 1.5r^2 \sin \alpha/2 [K_1 + (1 - \cos \alpha/2)K_2] + 3(\alpha/2)K_3$$

$K_1$ = the axial spring rate of one elastomeric bearing assembly (lb/in).
$K_2$ = radial spring rate of one elastomeric bearing assembly (lb/in).
$K_3$ = the angular spring rate of one elastomeric bearing assembly (in-lb/degree).
r = coupling radius at bearings (in).
$\alpha$ = misalignment between yoke 14 and rotor mast 12 (degrees).

In one constant velocity joint constructed in accordance with the teaching of the present invention, a limit torque of 967,500 inch pounds was assumed. The springs rates for the elastomeric bearing assemblies would be as follows:
$K_1$ = 4830 lb/in.
$K_2$ = 340,000 lb/in.
$K_3$ = 676 in-lb/deg.

While joint 10 can be used as a hub assembly drive joint as described without use of elastomeric bearings 116 and 118, as long as plates 24 and 28 are confined along axis 22, preferably the velocity joint 10 will have structure for limiting the angular misalignment and carrying the rotor thrust between the driving axis 22 and the driven axis 82. Therefore, a flapping and axial load transfer spring is mounted on joint 10. In particular, a lower ring 100 can be splined to spline section 16 for rotation with the mast 12 as best seen in FIGS. 4 and 5. An upper ring 102 can also be splined to the spline section 18 for rotation with mast 12. Both rings 100 and 102 and plates 24 and 28 can be secured on the mast 12 between the shoulder 104 and nut 106 threaded on end 20 of the mast 12. Both lower and upper rings 100 and 102 define spherical surfaces 108 which are centered on the flapping center 88.

A lower bowl 110 is secured to the yoke 14 by the bolts 87 that secure the pillow blocks 86 to the yoke 14. An upper bowl 112 is secured to the yoke 14 above the pillow blocks 86 by the bolts 87. Both lower bowl 110 and upper bowl 112 can be seen to have spherical surfaces 114 also centered on flapping center 88.

A lower spherical elastomeric bearing 116 is bonded or otherwise secured to the spherical surfaces of lower ring 100 and lower bowl 110. An upper spherical elastomeric bearing 118 is bonded or otherwise secured between the spherical surfaces on upper ring 102 and upper bowl 112. It can thus be seen that the angular misalignment permitted between the axes 22 and 82 is limited by the deformation in compression of the elastomeric bearings 116 and 118 and that the rotor thrust is carried by bearings 116 and 118.

Figure 7:
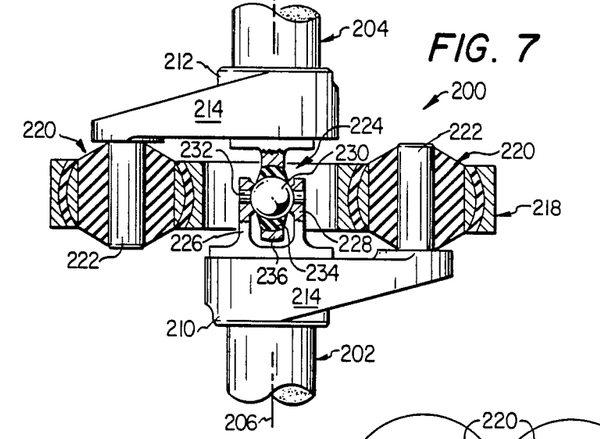
FIG. 7 is a vertical cross-sectional view of a constant velocity joint of the present invention intended for use in connecting any driving and driven members with constant velocity, including a thrust linkage for transferring axial loads between the rotating members.
Figures 8, 9:
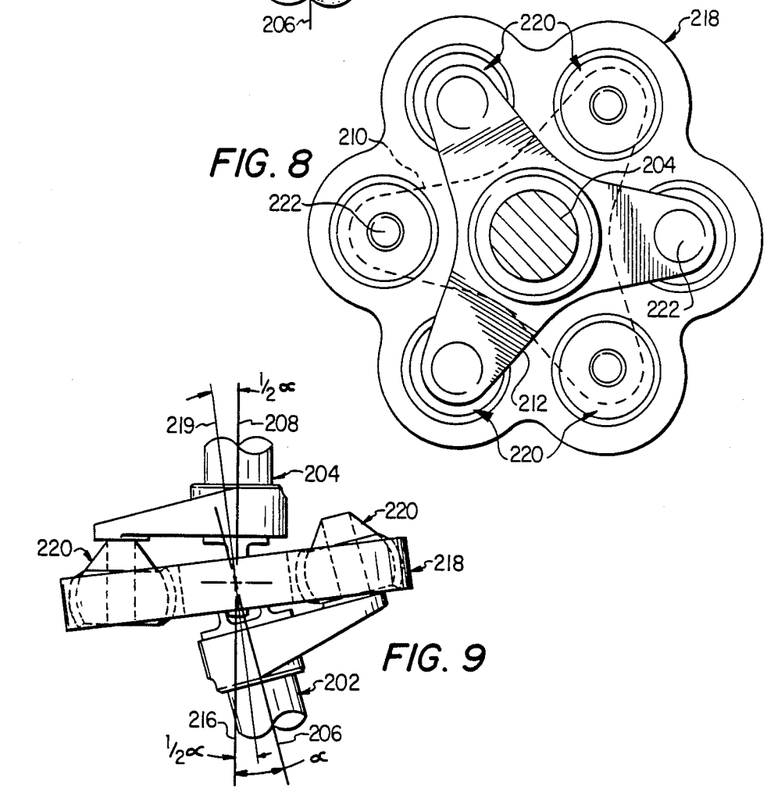
FIG. 8 is an end view of the constant velocity joint illustrated in FIG. 7.
FIG. 9 is a cross-sectional view of the constant velocity joint illustrated in FIG. 7 showing a misalignment between the axes of rotation of the members.

With reference now to FIGS. 7-9, constant velocity joint 200 of the present invention is illustrated. The joint 200 connects a first shaft 202 with a second shaft 204 for common rotation even if the rotational shaft 206 of the first axis 202 is misaligned with the rotational axis 208 of the second shaft 204. It will also be understood that either of the shafts can be the driving or driven member, as the constant velocity joint 200 is bidirectional.

The first member will be seen to have a triangularly shaped plate 210 secured at the end thereof. Second shaft 204 will be seen to have a similar triangular shaped plate 212 fixed at its end. Each of the arms 214 of plates 210 and 212 extend radially outward from the axis of rotation of the shaft to receive a bolt 222.

A carrier 218, identical in function to carrier 40 and having an axis of symmetry 219, is positioned between the ends of shafts 202 and 204 and also supports six elastomeric bearing assemblies 220 in the identical manner as carrier 40 supports elastomeric bearing assemblies 42 and 80. Elastomeric bearing assemblies 220, in turn, are identical in structure and function with the elastomeric bearing assemblies 42 and 80. Alternating bearing assemblies 220 about the circumference of the carrier 218 are secured through their inner cylinderical sections rigidly to an arm 214 of plate 210 or 212 by bolts 222. Torque can thus be transmitted from one shaft to the other through the elastomeric bearing assemblies 220 and carrier 218 in a manner substantially identical to constant velocity joint 10. As with carrier 40, the configuration of constant velocity joint 200 will always have the axis of symmetry 219 of the carrier 218 at an angle bisecting the angle of misalignment between the axes 206 and 208 as best seen in FIGURE 9.

In addition, constant velocity joint 200 includes a thrust linkage 224. The thrust linkage 224 includes a cleavis 226 formed on first shaft 206 having two parallel legs 228. A spherical ball 230 is secured between legs 228 by pin 232. An elastomeric bearing 234 having the shape of a spherical segment is bonded or otherwise secured on its inner surface to the ball 230. The outer surface is bonded or otherwise secured to the inner surface of a ring 236 extending from the first shaft. The thrust linkage 224 therefore permits the transfer of thrust forces between shafts 202 and 204 along their rotational axes while permitting some misalignment between the rotational axes.

A constant velocity joint has thus been disclosed which has significant advantages over prior art designs. The joint can be used in the environment of a flapping helicopter hub assembly, but can also be used with any power train, even with bidirectional torque transfer. The joint eliminates vibration common with nonconstant velocity joints. Furthermore, it requires no lubrication, is selfcentering and accommodates limited axial motion between the rotating members. The joint has a noncatastrophic failure mode should the elastomeric bearings shear or separate, which can be highly advantageous in environments such as a helicopter hub assembly. The placement of the elastomeric bearing assemblies in a carrier in a single plane minimizes the size of the joint and provides for most effective transfer of torque. A high torque transfer capacity is achieved, both by the absence of sliding friction between elements in the joint and the absence of severe shear in the elastomeric bearings.

Although several embodiments of the invention have been illustrated in the accompanying Drawings and described in the Detailed Description, it will be understood that the invention is not limited to the embodiments disclosed, but is intended to embrace any alternatives, modifications and/or substitutions of parts and elements falling within the scope of the invention as defined by the following claims.

We claim:

1. A constant velocity joint for joining a driving member to a driven member for joint rotation, the driving member rotating about a first axis and the driven member rotating about a second axis, the first and second axes being capable of misalignment, comprising:
   a rigid disk shaped carrier defining an axis of symmetry and having at least six apertures formed therethrough about the periphery thereof, each of the apertures centered on an aperture axis parallel to and spaced from the axis of symmetry, the walls of the apertures defining spherical surfaces centered on a first center along the axis of the aperture midway through the carrier;
   at least three elastomeric bearing assembly pairs, each of said pairs comprising a driving elastomeric bearing assembly and a driven elastomeric bearing assembly, each of said elastomeric bearing assemblies being received in one of the apertures in the rigid carrier, said elastomeric bearing assemblies including:
   (a) a spherical elastomeric bearing having an outer spherical surface secured to the wall of the aperture and an inner spherical surface concentric with the outer spherical surface, the center of curvature of the spherical surfaces coincident with the first center when the spherical elastomeric bearing is undeformed;
   (b) a rigid section having an outer spherical surface concentric with and attached to the inner spherical surface on the spherical bearing and having an inner cylindrical surface;
   (c) a cylindrical elastomeric bearing having an outer cylindrical surface secured to the inner cylindrical surface of the rigid intermediate section, the cylindrical elastomeric bearing having an inner cylindrical surface centered along the aperture axis;
   means for securing the inner cylindrical surface of the cylindrical elastomeric bearing of each of said driving elastomeric bearing assemblies around the circumference of the rigid carrier to the driving member so that the center axis of the inner cylindrical surface is parallel to and spaced from the first axis;
   means to secure the inner cylindrical surface of the cylindrical elastomeric bearing of each of said driven elastomeric bearing assemblies to the driven member with the center axis of the inner cylindrical surface parallel to and spaced from the second axis;
   the elastomeric bearing assemblies being deformable axially along their center axis, radially perpendicular to their center axis, and about their center of curvature, permitting torque to be transferred from the driving member to the driven member with constant velocity, the rigid carrier being oriented relative to the driving and driven members to ensure a constant velocity motion; and
   said rigid carrier having a center aperture centered generally on the axis of symmetry and one of said members having an extension comprising a spherical surface centered within the center aperture and the other of said members having a ring comprising an inner spherical surface concentric with the spherical surface on the extension, said constant velocity joint further including a spherical thrust elastomeric bearing secured between said ring and said extension to transmit axial thrust loads between the driving member and driven member.

2. The constant velocity joint of claim 1 wherein each of said elastomeric bearing assemblies received in said carrier is laminated and includes a plurality of rigid shaped pieces interconnected by elastomeric elements.

* * * * *